Dec. 20, 1938.    I. R. DAVIS    2,140,790
POWER TRANSMISSION
Filed June 26, 1937
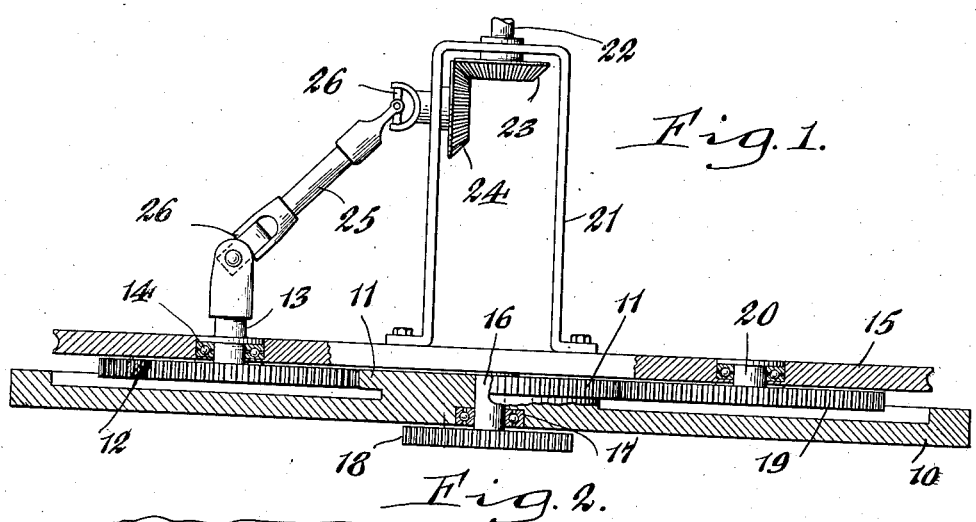
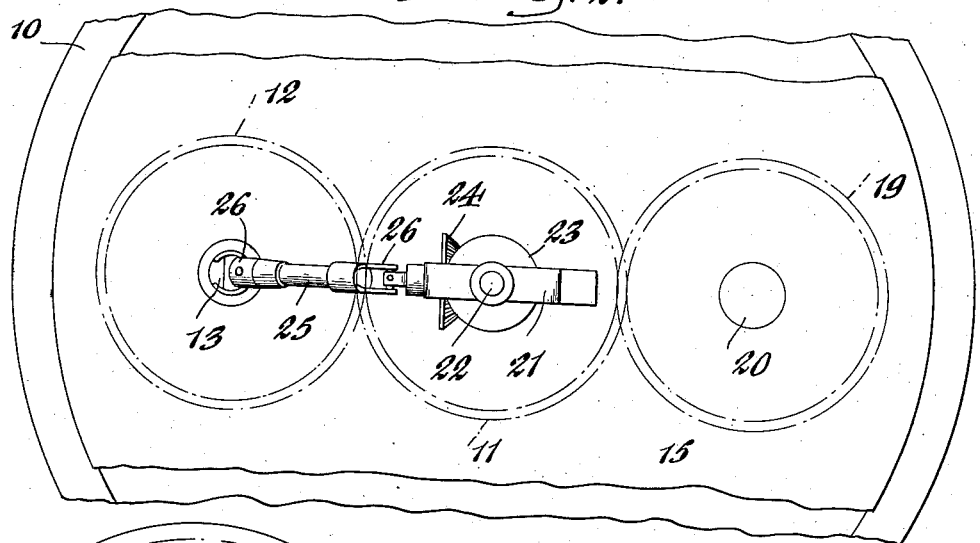
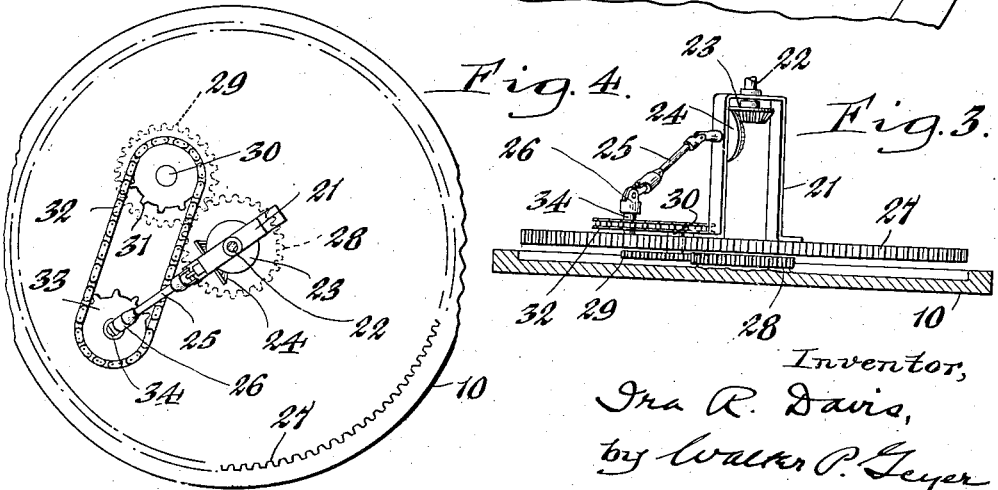
Inventor,
Ira R. Davis,
by Walter P. Geyer
Attorney.

Patented Dec. 20, 1938

2,140,790

UNITED STATES PATENT OFFICE 2,140,790

POWER TRANSMISSION

Ira R. Davis, Buffalo, N. Y.

Application June 26, 1937, Serial No. 150,553

4 Claims. (Cl. 74—300)

This invention relates to certain new and useful improvements in power transmission mechanism.

It has for one of its objects to provide a power transmission which is so designed and constructed as to develop maximum power or driving force at a minimum expense and with a minimum of effort.

Another object of the invention is to provide an apparatus of this character which is simple, compact and inexpensive in construction, which is positive and efficient in operation, and which has a wide application of use in the mechanical field.

Other features of the invention reside in the construction and arrangement of parts hereinafter described and particularly pointed out in the appended claims.

In the accompanying drawing:—

Figure 1 is a sectional elevation of the power transmission embodying my invention. Figure 2 is a fragmentary top plan view thereof. Figure 3 is a sectional elevation of a modified form of the invention. Figure 4 is a fragmentary top plan view of such modification.

Similar characters of reference indicate corresponding parts throughout the several views.

Referring to the embodiment of the invention illustrated in Figures 1 and 2, the numeral 10 indicates the base member or body upon which the working parts of my power transmission are supported or mounted and which may be of any appropriate construction, to suit the installation desired. Rising from this base member and fixedly secured thereto, or formed integrally therewith, is a stationary, substantially centrally-disposed toothed wheel or gear 11. Meshing with this gear to revolve about it and about its own axis is a driven gear 12 preferably of the same diameter as the gear 11 and fixed to the lower end of a driven shaft 13 journaled in bearings 14 of a revolving power output or take off member 15 which may be in the form of a pulley, as shown, and which carries a depending shaft 16 disposed axially thereof and journaled in a bearing 17 formed in the base member 10 and coinciding with the axis of the gear 11. At its lower end, this shaft 16 may be provided with a second output or take-off member which may be in the form of a gear 18. For the purpose of properly balancing the power take-off member 15 as it is revolved about the fixed gear 11, it is preferably provided with a second driven gear 19 which is fixed on a shaft 20 journaled in said member 15 and meshing with the gear 11, said gear 19 being of the same size as the companion gear 12 with the axis thereof disposed diametrically opposite that of such companion gear.

Rising from the power take-off member 15 substantially centrally thereof, is a bracket 21 in the upper end of which is journaled a driving shaft 22 which is connected with an electric motor or other power source and which is axially in line with the axis of rotation of the output member 15. Mounted on this shaft is a bevel gear 23 meshing with a companion bevel gear 24 which is connected by a flexible in-put or power-transmitting arm 25 with the shaft 13 of the driven gear 12. This power-transmitting arm, as clearly shown in Figure 1, may be in the form of a shaft connected by universal joints 26 with the companion ends of the shaft 13 and the shaft of the bevel gear 24, respectively, whereby motion is transmitted from the driving shaft 22 to the gear 12 through the medium of the bevel gears 23, 24 and the in-put arm 25, the latter being preferably disposed at an angle of approximately 45° to the vertical.

When motion is transmitted from the shaft 22 to the driving gear 12 in the manner just described, the latter as well as its companion gear 19 is revolved about the fixed gear 11, thereby transmitting motion to the take-off or out-put members 15 and 18, respectively, and effectually creating an increase in the driving force delivered by said members 15 and 18.

In the modified form of my invention depicted in Figures 3 and 4, I have shown a chain drive between the power-transmitting or in-put arm 25 and the driven gear of the transmission. In this case, the power output or take-off member is in the form of a comparatively large gear 27 and meshing with the central or fixed gear 28 is the driven gear 29 whose shaft 30 is journaled in said take-off member 27 and to which is fixed a sprocket gear 31. The latter is connected by a chain 32 with a sprocket gear 33 fixed to a shaft 34 journaled in the power take-off member and connected by the flexible in-put arm 25 with the driving shaft 22 in the same manner as the first-described construction. This arrangement likewise is very efficient in operation and creates a maximum driving force to the out-put member with a minimum expenditure of power. In this adaptation of my mechanism, it can be effectually used for driving vehicles and other transportation mediums.

I claim as my invention:

1. A power transmission mechanism, comprising a support, a gear fixed thereto, a revolving power output member mounted on said support axially of said gear and having a driven gear journaled thereon at one side of its axis of revolution and meshing with said fixed gear, a bearing bracket disposed centrally of and extending from one side of said output member, a driving shaft journaled in said bracket and having its axis of revolution in axial alinement with that of the output member, and an angularly disposed shaft operatively connected at its ends by universal joints to said driving shaft and said driven gear.

2. A power transmission mechanism, comprising a support, a revolving output member journaled on said support and having a bearing bracket thereon, a drive means including a shaft journaled in said bracket, and means for transmitting motion from said drive means to said output member consisting of a fixed gear secured to said support axially of the output member, a rotatable gear journaled on said output member at one side of its axis and meshing with said fixed gear, and a power-transmitting connection between said drive means shaft and said rotatable gear.

3. A power transmission mechanism, comprising a support, a revolving output member journaled on said support and having a bearing bracket thereon, a drive means including a shaft journaled in said bracket, and means for transmitting motion from said drive means to said output member consisting of a fixed gear secured to said support axially of the output member, rotatable gears of equal size journaled on said output member at diametrically opposite sides of its axis and meshing with said fixed gear, and a power-transmitting connection between said drive means shaft and one of said rotatable gears.

4. A power transmission mechanism, comprising a support, a revolving output member journaled on said support, a drive means, and means for transmitting motion from said drive means to said output member consisting of a fixed gear secured to said support axially of the output member, a rotatable gear journaled on said output member at one side of its axis and meshing with said fixed gear, a pair of chain-connected sprockets mounted on said output member, one of the sprockets being coaxial with the rotatable gear to revolve therewith, and a power-transmitting connection between said drive means and the other of said sprockets.

IRA R. DAVIS.